No. 790,834. PATENTED MAY 23, 1905.
G. W. HARVEY.
FRUIT CLEANER.
APPLICATION FILED DEC. 22, 1903.
2 SHEETS—SHEET 2.
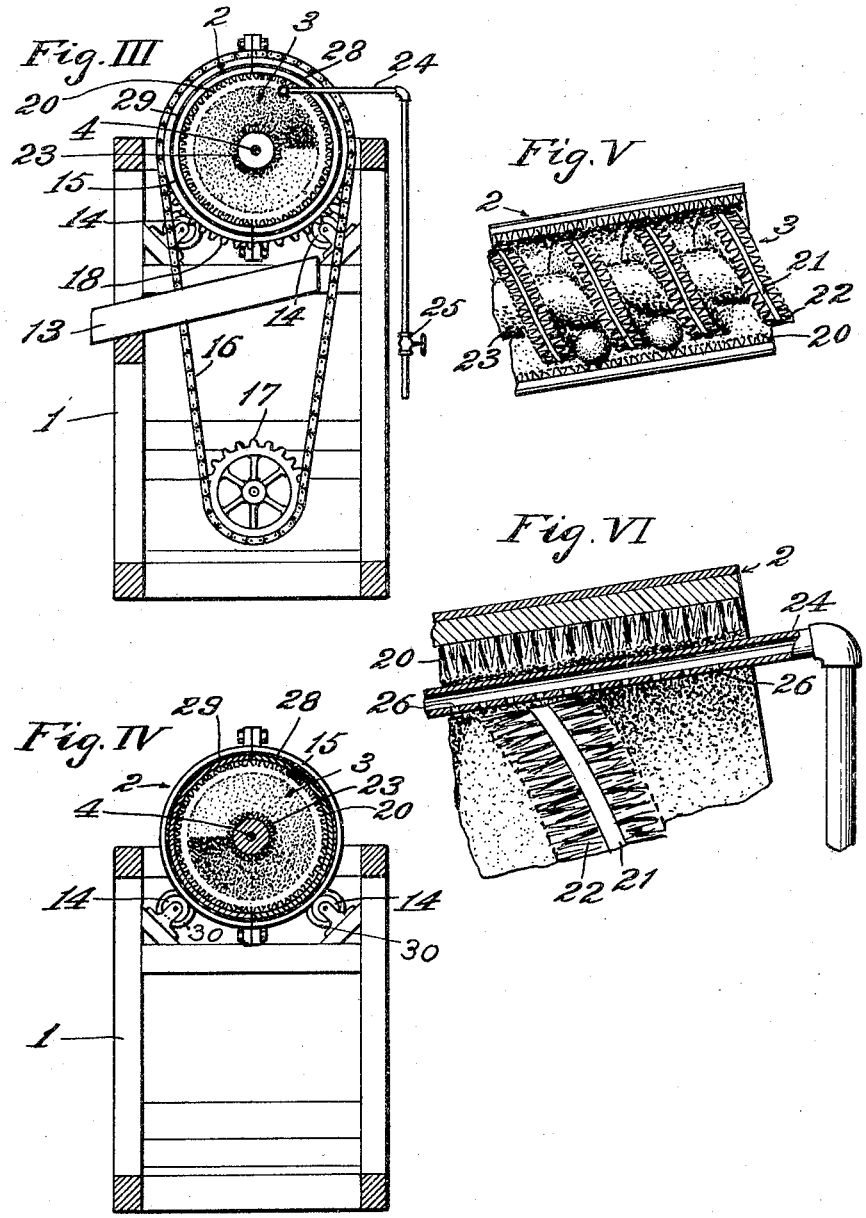
Witnesses:
C. C. Heolly
Q. P. Knight
Inventor:
George W. Harvey
by Townsend Bros
Attys.

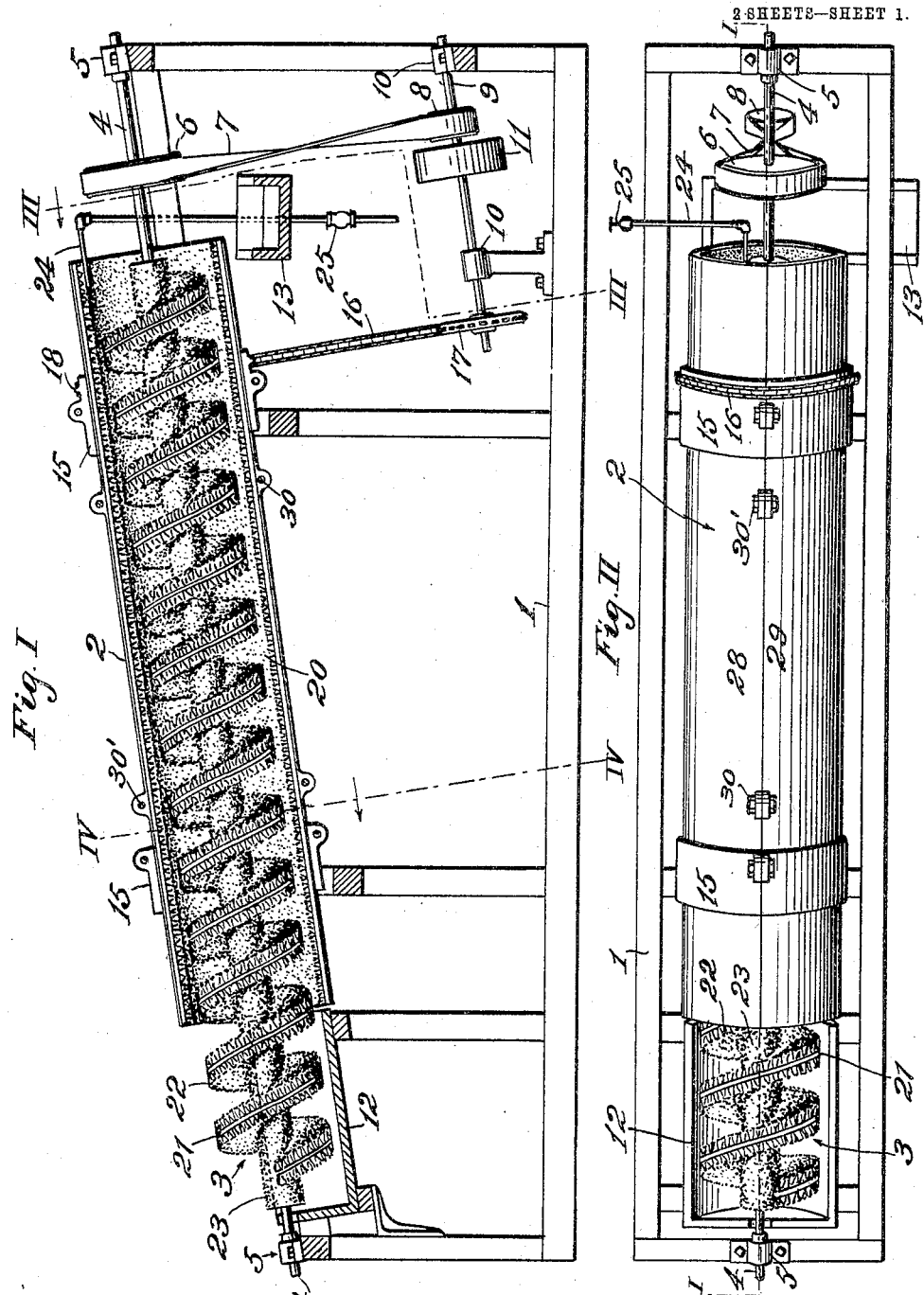

No. 790,834.

Patented May 23, 1905.

UNITED STATES PATENT OFFICE.

GEORGE W. HARVEY, OF MONROVIA, CALIFORNIA, ASSIGNOR OF ONE-HALF TO NORMAN WILLIAMS, OF LOS ANGELES, CALIFORNIA.

FRUIT-CLEANER.

SPECIFICATION forming part of Letters Patent No. 790,834, dated May 23, 1905.

Application filed December 22, 1903. Serial No. 186,149.

*To all whom it may concern:*

Be it known that I, GEORGE W. HARVEY, a citizen of the United States, residing at Monrovia, in the county of Los Angeles and State of California, have invented new and useful Improvements in Fruit-Cleaners, of which the following is a specification.

This invention relates particularly to an apparatus for cleaning fruit, certain of its features, however, being applicable in other connections, as in nut-hulling.

The primary object of the invention is to provide an apparatus wherein the fruit or other objects being cleaned or operated on are moved progressively forward and at the same time subjected to friction in a uniform manner without any positive pressure on or compression of the fruit, the fruit being held against the brushing-surface substantially by its own weight.

A further object of the invention is to provide for uniform cleaning or scouring action on all sides of the fruit.

Another object of the invention is to enable the fruit to be cleaned with a minimum expenditure of power.

Other objects of the invention will appear in and from the following specification and claims.

The accompanying drawings illustrate the invention, and, referring to the same, Figure I is a vertical longitudinal section on the line I I, Fig. II. Fig. II is a plan. Fig. III is a transverse section on the line III III, Fig. I. Fig. IV is a section on the line IV IV, Fig. I. Fig. V is a fragmentary longitudinal section of the cleaner-drum and inclosed propeller-brush, showing a somewhat different form of the latter from that shown in Fig. I. Fig. VI is a fragmentary section of a part of one form of the cleaner-drum and inclosed devices.

The apparatus comprises a suitable frame 1, wherein the various parts are mounted, a drum 2, and a spiral propeller or screw 3, mounted to turn in said drum. Said screw has an axial shaft 4, rotating in the journal-bearings 5 on the frame 1 and driven by suitable means, such as a pulley 6 on said shaft, and engaged by a belt 7, leading from a pulley 8 on a driving-shaft 9, mounted in journal-bearings 10 and provided with a driving-pulley 11. The drum 2 and the contained screw are preferably inclined to the horizontal, and the lower end of the screw 3 projects beyond the drum into a trough or box 12, adapted to receive the fruit to be cleaned. This trough desirably surrounds the screw sufficiently close to cause the fruit placed in the trough to pass into engagement with the screw, and said box extends sufficiently close to the lower end of the drum 2 to form therewith a substantially continuous support for the fruit in its upward propulsion by the screw. A chute or trough 13 extends under the other end of the drum to receive the clean fruit and guide it to any suitable receptacle. The drum or cylinder 2 is open at its lower end, and the trough 12 is so placed that the water can find free exit from the lower end of the drum.

The drum or cylinder 2 is desirably made to rotate, being supported by rolls or wheels 14 in the frame 1, engaging with the circular tracks or rings 15 on the drum, the chain 16 passing over sprocket-wheels 17 18 on the driving-shaft 9 and on the drum, wheels 14, having flanges 30, engaging the edge of the corresponding ring to prevent endwise movement of the drum.

The drum 2 is furnished on its inner face with suitable brushes, bristles, or other resilient frictional means 20 to engage and scour the fruit, the brushes extending substantially throughout said inner face to form a brush-surface for supporting the fruit in its passage through the drum, and the spiral web 21 of the propeller or screw 3 is provided with similar brush means 22, and I may also provide the shaft 4 of the screw with similar brush means 23, which, as shown in Fig. 1, may be either sufficiently removed from the interior brushes on the drum to permit of some accumulation of fruit between them or desirably, as shown in Fig. V, may approach so closely to the interior brushes as to permit of the passage of only one fruit at a time and to engage with one side of said fruit while the interior brushes are engaging with the other side, thus effecting a more rapid and perfect scouring action. The spiral web of the propeller approaches closely to the interior brush-surface of the drum to confine the fruit to the spaces between the threads of the screw.

A pipe 24, connected to any source of water-supply and provided with a valve 25, extends into the upper end of the drum 2, where it is provided with discharge-orifices 26, adapted to distribute or spray the water into the drum. The distance to which this pipe extends into the drum may be varied according to the service. Thus in a rotating drum, as shown in Fig. I, the nozzle-pipe may extend only a short distance, the rotation of the drum being depended upon to carry the water the full length of the drum, whereas if the drum be stationary it will be desirable to extend the nozzle-pipe over the rotating screw, as indicated in Fig. VI, the nozzle-pipe preferably extending in this case the full length of the drum.

For convenience of construction and repair the drum 2 may be formed in halves 28 29, fastened together by bolts 30'.

The operation may be described as follows: The driving mechanism being set in operation, the screw 3 and drum 2 are caused to rotate in opposite directions, the motion of the screw being such as to cause propulsion upwardly along the drum. Water is turned on through pipe 24 and soon wets the whole brush-surface of the drum and screw, the waste water running out through the lower end of the drum. The fruit, such as oranges or lemons, is placed in the trough 12 by the attendant and is immediately caught by the screw and carried into the lower end of the drum and then upwardly on the interior brush-surface of the drum. The fruit resting on this brush-surface by its own weight and resting against the screw-brush also by its own weight is subjected to a compound action which turns or rotates it in every direction and brushes or scours all sides of it equally. The propulsive movement of the fruit upwardly within the drum by the screw tends to turn the fruit over in one direction, while the rotary movement of the drum tends to turn the fruit in a transverse direction, an additional twisting or turning effect being due to the friction of the fruit on the screw-brush due to the rotative movement of the latter. With the usual scrubbing-machines now employed the tendency is to turn the fruit over and over in the same direction, particularly if the fruit be elongated, and the ends of the fruit are thus not thoroughly cleaned. With the compound movement and brush action above described all parts are subjected equally to the scrubbing action. In the above operation the rubbing of the brushes on the fruit produces a continual spray or movement of the water, thereby thoroughly moistening and washing the fruit. A powerful spraying action is also produced by the continual throwing of water back and forth between the water-receptive brush-surfaces of the drum and screw. It is essential to this action that the water be supplied in gradual or limited quantity, so as to allow the water to be thrown in drops from one brush-surface to the other. The fruit passes out at the upper end of the drum into the trough 13, which conveys the cleaned fruit to any suitable receiving means.

The nature of the brushes used on the screw and drum will depend on the work to be performed. Thus for cleaning citrus fruit the ordinary soft brushes may be used, whereas for cleaning or hulling nuts wire brushes will be desirable.

What I claim is—

1. In an apparatus for the purpose described, the combination with an inclined rotatable drum provided with a brush-surface substantially throughout its interior face, and open at its lower end for entrance of fruit, a propelling-screw rotatably mounted longitudinally of said drum, said propelling-screw extending beyond the lower end of the drum, a feed-trough at the lower end of the propelling-screw to receive fruit or other objects and cause engagement thereof with the propelling-screw, means for rotating the propelling-screw in a direction to move the fruit upwardly along the drum and means for rotating the drum oppositely to the screw.

2. In an apparatus for the purpose described, the combination with an inclined rotatable drum provided with a brush-surface substantially throughout its interior face and open at its lower end for free exit of water, a propelling-screw rotatably mounted longitudinally of said drum, said propelling-screw extending beyond the lower end of the drum, a feed-trough at the lower end of the propelling-screw to receive fruit or other objects and cause engagement thereof with the propelling-screw, means for rotating the propelling-screw in a direction to move the fruit upwardly along the drum, means for rotating the drum oppositely to the screw, and means for a gradual supply of water to the interior of said drum.

3. An apparatus comprising an inclined rotatable drum provided with brush means substantially throughout its interior surface, means for gradually supplying water to the upper end of said drum, a propelling-screw rotatably mounted in said drum, and approaching closely to the brushes thereon, said propelling-screw being provided with brush means on its helical faces, driving devices to rotate such screw in a direction to cause propulsion upwardly along the drum, means for rotating the drum, and a feed-trough at the lower end of the screw.

In testimony whereof I have hereunto signed my name, in the presence of two subscribing witnesses, at Los Angeles, in the county of Los Angeles and State of California, this 15th day of December, 1903.

GEORGE W. HARVEY.

Witnesses:
ARTHUR P. KNIGHT,
JULIA TOWNSEND.